US 6,678,840 B1

(12) United States Patent
Kessler et al.

(10) Patent No.: US 6,678,840 B1
(45) Date of Patent: Jan. 13, 2004

(54) FAULT CONTAINMENT AND ERROR RECOVERY IN A SCALABLE MULTIPROCESSOR

(75) Inventors: Richard E. Kessler, Shrewsbury, MA (US); Peter J. Bannon, Concord, MA (US); Kourosh Gharachorloo, Menlo Park, CA (US); Thukalan V. Verghese, San Carlos, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 568 days.

(21) Appl. No.: 09/651,949

(22) Filed: Aug. 31, 2000

(51) Int. Cl.[7] ............................. G06F 11/00; H04L 1/00
(52) U.S. Cl. ........................... 714/51; 714/55; 714/749
(58) Field of Search ............................. 714/51, 55, 23, 714/749

(56) References Cited

U.S. PATENT DOCUMENTS

| | | | |
|---|---|---|---|
| 5,261,066 A | 11/1993 | Jouppi et al. ................ | 395/425 |
| 5,317,718 A | 5/1994 | Jouppi ......................... | 395/425 |
| 5,754,757 A * | 5/1998 | Shrivastava et al. .......... | 714/11 |
| 5,758,183 A | 5/1998 | Scales ......................... | 395/825 |
| 5,761,729 A | 6/1998 | Scales ......................... | 711/148 |
| 5,787,480 A | 7/1998 | Scales et al. ................ | 711/148 |
| 5,802,585 A | 9/1998 | Scales et al. ................ | 711/154 |
| 5,809,450 A | 9/1998 | Chrysos et al. .............. | 702/186 |
| 5,875,151 A | 2/1999 | Mick ........................... | 365/233 |
| 5,890,201 A | 3/1999 | McLellan et al. ............ | 711/108 |
| 5,893,931 A | 4/1999 | Peng et al. .................. | 711/206 |
| 5,918,250 A | 6/1999 | Hammond .................. | 711/205 |
| 5,918,251 A | 6/1999 | Yamada et al. .............. | 711/207 |
| 5,923,872 A | 7/1999 | Chrysos et al. .............. | 395/591 |
| 5,924,119 A * | 7/1999 | Sindhu et al. ............... | 711/141 |
| 5,950,228 A | 9/1999 | Scales et al. ................ | 711/148 |
| 5,964,867 A | 10/1999 | Anderson et al. ........... | 712/219 |
| 5,983,325 A | 11/1999 | Lewchuk ..................... | 711/137 |
| 6,000,044 A | 12/1999 | Chrysos et al. ............... | 714/47 |
| 6,070,227 A | 5/2000 | Rokicki ....................... | 711/117 |
| 6,075,938 A * | 6/2000 | Bugnion et al. .............. | 703/27 |
| 6,085,300 A | 7/2000 | Sunaga et al. .............. | 711/168 |
| 6,115,763 A * | 9/2000 | Douskey et al. .............. | 710/72 |
| 6,151,689 A * | 11/2000 | Garcia et al. ................ | 714/49 |
| 6,249,880 B1 * | 6/2001 | Shelly et al. ................. | 714/34 |
| 6,304,967 B1 * | 10/2001 | Braddy ....................... | 713/150 |
| 6,484,217 B1 * | 11/2002 | Fuente et al. ................ | 710/15 |
| 6,542,926 B2 * | 4/2003 | Zalewski et al. ........... | 709/213 |

OTHER PUBLICATIONS

*Alpha Architecture Reference Manual*, Third Edition, The Alpha Architecture Committee, 1998 Digital Equipment Corporation (21 p.), in particular pp. 3–1 through 3–15.
*A logic Design Structure for LSI Testability*, E. B. Eichelberger et al., 1977 IEEE (pp. 462–468).
*Direct RDRAM™ 256/288–Mbit* (512K×16/18×32s), Preliminary Information Document DL0060 Version 1.01 (69 p.).

(List continued on next page.)

*Primary Examiner*—Robert Beausoliel
*Assistant Examiner*—Emerson Puente

(57) ABSTRACT

A multi-processor computer system permits various types of partitions to be implemented to contain and isolate hardware failures. The various types of partitions include hard, semi-hard, firm, and soft partitions. Each partition can include one or more processors. Upon detecting a failure associated with a processor, the connection to adjacent processors in the system can be severed, thereby precluding corrupted data from contaminating the rest of the system. If an interprocessor connection is severed, message traffic in the system can become congested as messages become backed up in other processors. Accordingly, each processor includes various timers to monitor for traffic congestion that may be due to a severed connection. Rather than letting the processor continue to wait to be able to transmit its messages, the timers will expire at preprogrammed time periods and the processor will take appropriate action, such as simply dropping queued messages, to keep the system from locking up.

4 Claims, 7 Drawing Sheets

OTHER PUBLICATIONS

*Testability Features of AMD–K6™ Microprocessor,* R. S. Fetherston et al., Advanced Micro Devices (8 p.).

*Hardware Fault Containment in Scalable Shared–Memory Multiprocessors,* D. Teodosiu et al., Computer Systems Laboratory, Stanford University (12 p.), 1977.

*Cellular Disco: resource management using virtual clusters on shared–memory multiprocessors,* K. Govil et al., 1999 ACM 1–58113–140–2/99/0012 (16 p.).

*Are Your PLDs Metastable?,* Cypress Semiconductor Corporation, Mar. 6, 1997 (19 p.).

*Rambus® RIMM 198 Module (with 128/144Mb RDRAMs),* Preliminary Information, Document DL0084 Version 1.1 (12 p.).

*Direct Rambus ™ RIMM ™ Module Specification Version 1.0,* Rambus Inc., SL–0006–100 (32 p.), 2000.

*End–To–End Fault Containment In Scalable Shared–Memory Multiprocessors,* D. Teodosiu, Jul. 2000 (148 p.).

* cited by examiner

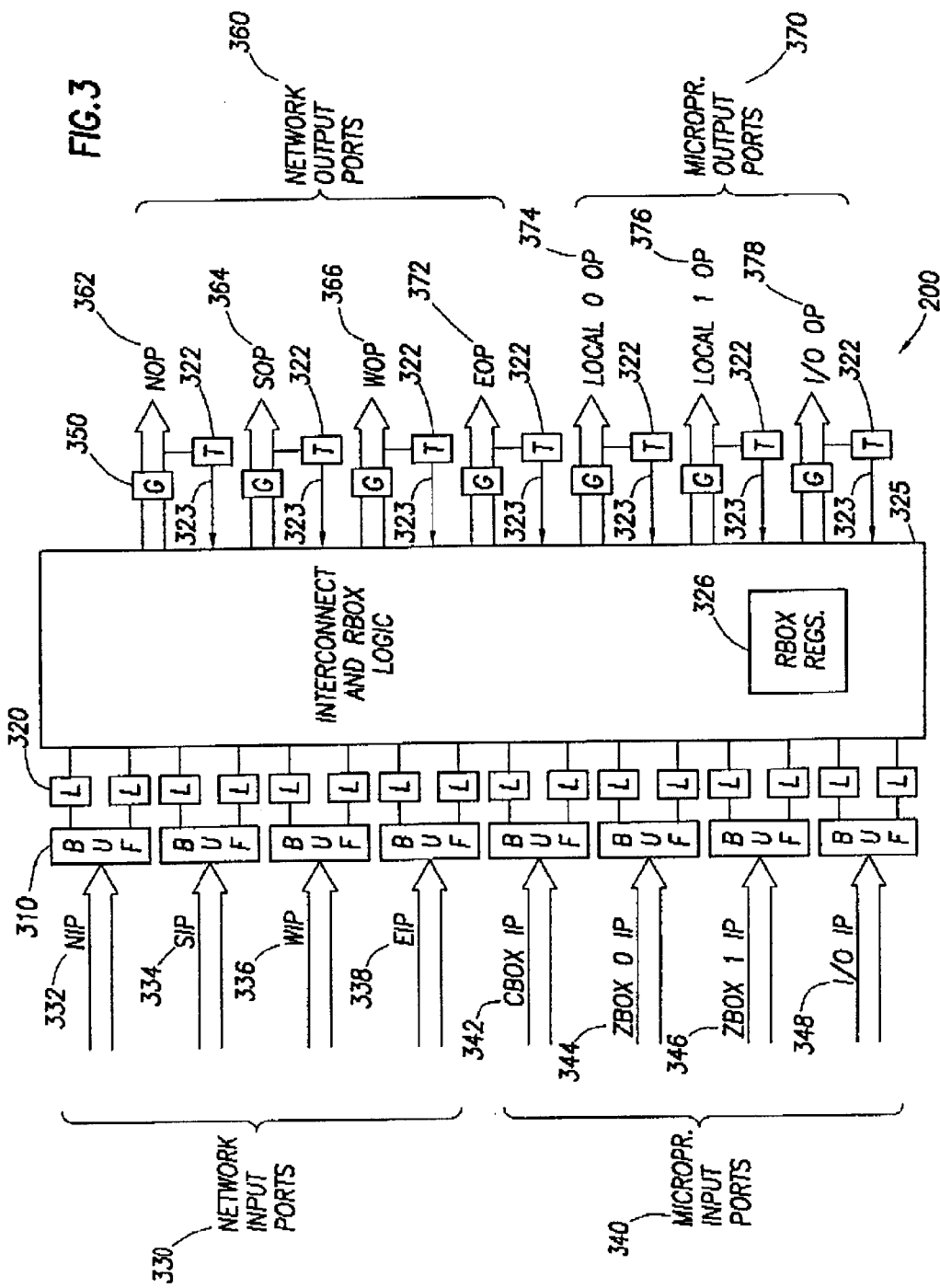

FAULT CONTAINMENT AND ERROR RECOVERY IN A SCALABLE MULTIPROCESSOR

CROSS-REFERENCE TO RELATED APPLICATIONS

This application relates to the following commonly assigned co-pending applications entitled: "Apparatus And Method For Interfacing A High Speed Scan-Path With Slow-Speed Test Equipment," Ser. No. 09/653,642, filed Aug. 31, 2000 "Priority Rules For Reducing Network Message Routing Latency. " Ser. No. 09/652,322, filed Aug. 31, 2000 "Scalable Directory Based Cache Coherence Protocol," Ser. No. 09/652,703, filed Aug. 31, 2000 "Scalable Efficient I/O Port Protocol," Ser. No. 09/652,391, filed Aug. 31, 2000 "Efficient Translation Lookaside Buffer Miss Processing In Computer Systems With A Large Range Of Page Sizes " Ser. No. 09/652,552, filed Aug. 31, 2000 "Speculative Directory Writes In A Directory Based Cache Coherent Nonuniform Memory Access Protocol" Ser. No. 09/652,834, filed Aug. 31, 2000 "Special Encoding Of Known Bad Data," Ser. No. 09/652,314, filed Aug. 31, 2000 "Broadcast Invalidate Scheme," Ser. No. 09/652,165, filed Aug. 31, 2000 "Mechanism To Track All Open Pages In A DRAM Memory System," Ser. No. 09/652,704, filed Aug. 31, 2000 "Programmable DRAM Address Mapping Mechanism," Ser. No. 09/653,093, filed Aug. 31, 2000 "Computer Architecture And System For Efficient Management Of Bi-Directional Bus." Ser. No. 09/652,323 filed Aug. 31, 2000 "An Efficient Address Interleaving With Simultaneous Multiple Locality Options," Ser. No. 09/652,452, filed Aug. 31, 2000 "A High Performance Way Allocation Strategy For A Multi-Way Associative Cache System," Ser. No. 09/653,092, filed Aug. 31, 2000 "Method And System For Absorbing Defects In High Performance Microprocessor With A Large N-Way Set Associative Cache," Ser. No. 09/651,948, filed Aug. 31, 2000 "A Method For Reducing Directory Writes And Latency In A High Performance, Directory-Based, Coherency Protocol," Ser. No. 09/652,324, filed Aug. 31, 2000 "Mechanism To Reorder Memory Read And Write Transactions For Reduced Latency And Increased Bandwidth," Ser. No. 09/653,094, filed Aug. 31, 2000 "System For Minimizing Memory Bank Conflicts In A Computer System," Ser. No. 09/652,325, filed Aug. 31, 2000 "Computer Resource Management And Allocation System," Ser. No. 09/651,945, filed Aug. 31, 2000 "Input Data Recovery Scheme," Ser. No. 09/653,643, filed Aug. 31, 2000 "Fast Lane Prefetching." Ser. No. 09/652,451, filed Aug. 31, 2000 "Mechanism For Synchronizing Multiple Skewed Source-Synchronous Data Channels With Automatic Initialization Feature." Ser. No. 09/652,480, filed Aug. 31, 2000 "Mechanism To Control The Allocation Of An N-Sourcse Shared Buffer," Ser. No. 09/651,924, filed Aug. 31, 2000 and "Chaining Directory Reads And Writes To Reduce DRAM Bandwidth In A Directory Based CC-NUMA Protocol," Ser. No. 09/652,315, filed Aug. 31, 2000 and provisional application titled "Alpha Processor," Ser. No. 60/229,412, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a multi-processor computer system. More particularly, the invention relates to fault isolation in a multi-processor computer system.

2. Background of the Invention

As the name suggests, multi-processor computer systems are computer systems that contain more than one microprocessor. Data can be passed from one processor to another to another in such systems. One processor can request a copy of a block of another processor's memory. As such, memory physically connected to or integrated into one processor can be shared by other processors in the system. A high degree of shareability of resources (e.g., memory) generally improves system performance and enhances the capabilities of such a system.

Resource sharing in a multi-processor computer system, although advantageous for performance, increases the risk of a data error propagating through the system and causing widespread harm in the system. For example, multiple processors may need a copy of a data block from a source processor. The requesting processors may need to perform an action dependent upon the value of the data. If the data becomes corrupted as it is retrieved from the source processor's memory (or may have become corrupted when it was originally stored in the source processor), the requesting processors may perform unintended actions. Hardware failures in one processor or logic associated with one processor may cause corruption or failures in other parts of the system. Accordingly, techniques for fault containment are needed.

Several fault isolation techniques have been suggested. One suggestion has been to allow controlled memory sharing in a system that is page-based and that relies on a processor with precise memory faults. Such a page-based technique is relatively complex to implement. Although acceptable in that context, a need still exists to isolate faults in a computer system that is easier to implement than a page-based technique. Further, it would be desirable to have an isolation strategy that works in a multi-processor system in which the processors do not have precise memory exceptions. Despite the advantages such a system would provide, to date no such system is known to exist.

BRIEF SUMMARY OF THE INVENTION

The problems noted above are solved in large part by a multi-processor computer system that permits various types of partitions to be implemented to contain and isolate hardware failures. The various types of partitions include hard, semi-hard, firm, and soft partitions. Each partition can include one or more processors. Upon detecting a failure associated with a processor, the connection to adjacent processors in the system can be severed, thereby precluding corrupted data from contaminating the rest of the system.

If an inter-processor connection is severed, message traffic in the system can become congested as messages become backed up in other processors. Accordingly, the preferred embodiment of the invention includes various timers in each processor to monitor for traffic congestion that may be due to a severed connection. Rather than letting the processor continue to wait to be able to transmit its messages, the timers will expire at preprogrammed time periods and the processor will take appropriate action, such as simply dropping queued messages, to keep the system from locking up. Each processor preferably includes individual timers for different types of messages (e.g., request, response). These and other advantages will become apparent upon reading the reviewing the following description.

BRIEF DESCRIPTION OF THE DRAWINGS

For a detailed description of the preferred embodiments of the invention, reference will now be made to the accompanying drawings in which:

FIG. 3 shows a block diagram of the router logic used in the microprocessor of FIGS. 2a and 2b;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
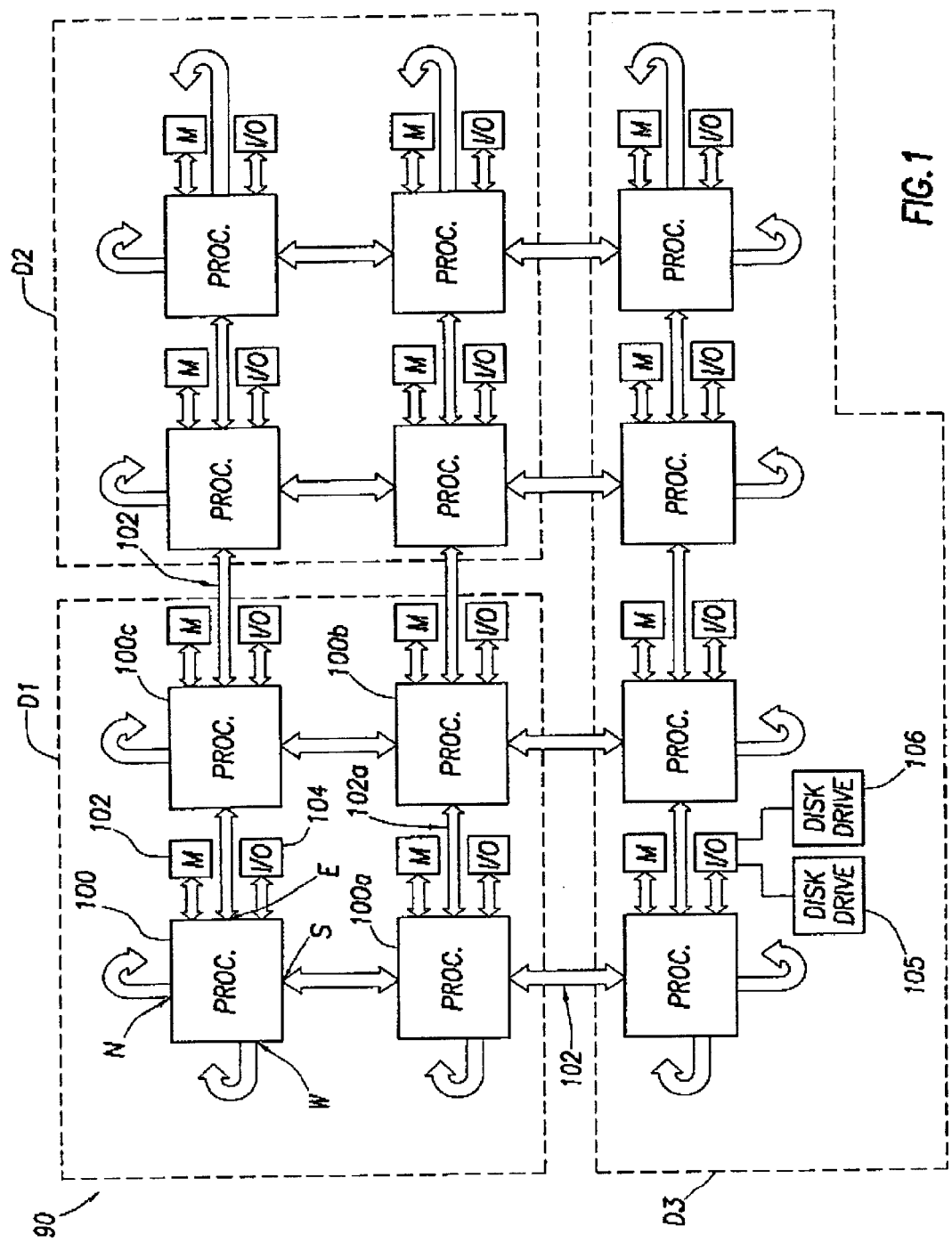
FIG. 1 shows a system diagram of a plurality of microprocessors coupled together.

Referring now to FIG. 1, in accordance with the preferred embodiment of the invention, computer system 90 comprises one or more processors 100 each preferably coupled to a memory 102 and an input/output ("I/O") controller 104. As shown, computer system 90 includes 12 processors 100, each processor coupled to a memory and an I/O controller. Each processor preferably includes four ports for connection to adjacent processors. The inter-processor ports are designated "north," "south," "east," and "west" in accordance with the well-known Manhattan grid architecture. As such, each processor 100 can be connected to four other processors. The processors on both end of the system layout wrap around and connect to processors on the opposite side to implement a 2D torus-type connection. Although 12 processors 100 are shown in the exemplary embodiment of FIG. 1, any desired number of processors (e.g., 256) can be included.

I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMbus™ memory devices, but other types of memory devices can be used if desired. The capacity of the memory devices 102 can be any suitable size. Further, memory devices 102 preferably are implemented as Rambus Interface Memory Modules ("RIMMS").

In general, computer system 90 can be programmed so that any processor 100 can access its own memory 102 and I/O devices as well as the memory and I/O devices of all other processors in the network. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Fault isolation in the multi-processor system 90 shown in FIG. 1 is implemented by way of "domains." A domain includes one or more processors 100. Three exemplary domains, D1, D2, and D3, are shown in FIG. 1. Each of the exemplary domains D1–D3 shown in FIG. 1 includes four processors 100. Messages can be routed between processors within a given domain. The preferred embodiment, however, treats cross boundary messages differently than intra-domain messages.

The domains of multiprocessor system 90 provide varying degrees of isolation and sharing of resources between domains. System 90 preferably permits the implementation of hard partitions, semi-hard partitions, firm partitions, and soft partitions. These partitions, defined below, are set up by programming various registers in each processor as explained below.

In a hard partition there is no communication between domains that are subject to the hard partition. In this way, corrupted data, for example, is simply not permitted to cross the domain boundary. Of course, uncorrupted data also is not permitted to cross the domain boundary.

A firm partition allows domains to share a portion of its memory. Accordingly, some of the memory within a given domain is designated as "local" while other memory is designated as "global." As shown in FIG. 1, each processor 100 preferably is coupled to a memory 102. In a firm partition, a portion of memory 102 is local and another portion can be global. Further, local memory can also be designated as global. Local memory means memory locations that only the processors within the domain can access. That is, a processor is not permitted to access local memory associated with a processor in another domain. Global memory, on the other hand, can be accessed by processors outside the domain in which the memory is physically located.

A semi-hard partition is a firm partition with some additional restrictions and additional hardware reliability assurances. A semi-hard partition generally requires that all communication within a given domain must stay within the domain. Only sharing traffic to the "global" memory region may cross domain boundaries. Hardware failures in one domain can cause corruption or fatal errors within the domain that contains the error. Hardware failures in any domain can also corrupt the "global" region of memory. However, hardware failures in one domain will not corrupt the local memory of any other domains.

A soft partition allows for all communication to cross domain boundaries. The domain is strictly a software concept in this case. The partitions can share a "global" portion of memory. Each domain has a region of local memory that the other domains cannot access. What memory is global and which is local preferably is programrnmable. A hardware failure in one domain may cause corruption in any other domain in a soft partition. Various registers discussed below are used to set up a self memory partition.

The system 90 can be configured as described above to implement any one or more of the preceding types of partitions. The response of the system to a failure will now be described. Those failures (e.g., single bit errors) that can be corrected, preferably are corrected as the data is passed from one processor to another. The processors 100 preferably pack the data with error correction code ("ECC") bits to permit detection and recovery of a single bit error in accordance with known techniques. Double bit errors preferably can be detected, but may not be able to be corrected. Data preferably is transmitted as "packets" of data (also referred to as "ticks"). If the first tick of a packet includes a double bit error, the entire message is discarded. If the double bit error occurs on one of the last ticks of a data packet being received by a processor, by the time the processor detects the presence of the error, the processor may have already begun forwarding the a first ticks on to the next processor in the communication path. In this case the entire packet is sent, even if it contains the error. Regardless of which tick experienced the double bit error, both directions on the channel are placed into a state in which no transmissions are permitted to occur. For example, referring still to FIG. 1, if processor 100*b* detects a double bit error on a transmission from processor 100*a* over channel 102*a*, processor 100*b* takes down the channel 102*a* in both directions thereby severing the communication between processors 100*a* and 100*b* via channel 102*a*.

Not only are communications initiated by processor 100*a* and destined for processor 100*b* effectively terminated, the same is true for any communication that would otherwise be transmitted across channel 102*a*. Terminating a communication channel 102 involves disabling all output ports and ignoring all input signals. Disabling an output port includes stopping any clock signals that are otherwise necessary for the proper operation of the output port.

Although terminating a communication channel 102 effectively isolates a failure, because of the distributed, resource sharing nature of the multiprocessor system 90, the terminated channel may cause undesirable traffic congestion. Messages that would otherwise have been routed through the now terminated channel back up which in turn causes other messages to back up as well. The problem is akin to an airport that is unusable due to a rain storm for example that causes a rippling effect in other airports as air traffic begins to congest.

The preferred embodiment of the invention uses various timers to solve this problem. These timers preferably are included in each processor 100. The following description of FIGS. 2*a* and 2*b* describe a preferred embodiment of the processor. Following this general description of processor 100, the use of the timers will be described.

Figure 2A:
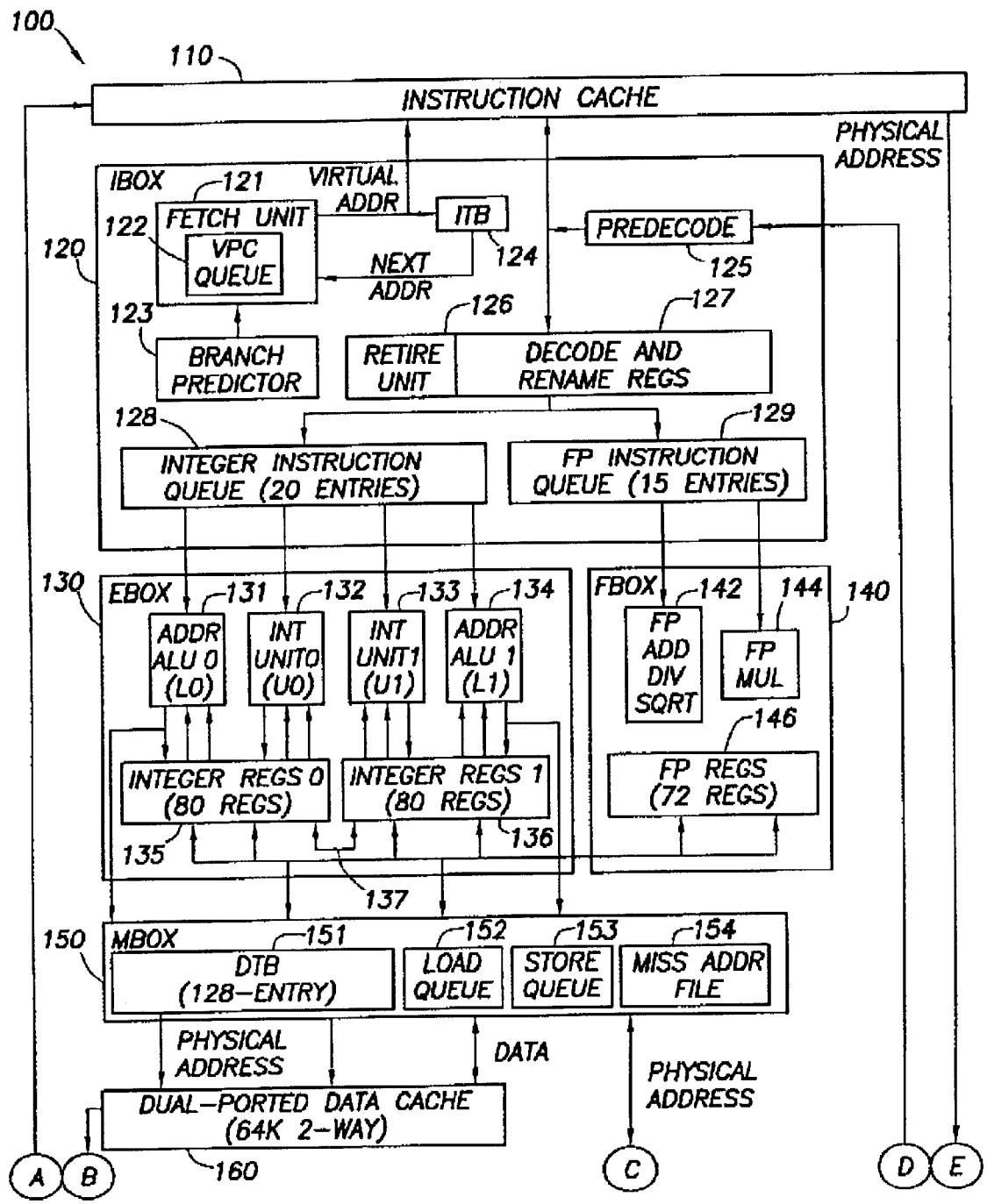
FIGS. 2a and 2b show a block diagram of the microprocessors of FIG. 1.
Figure 2B:
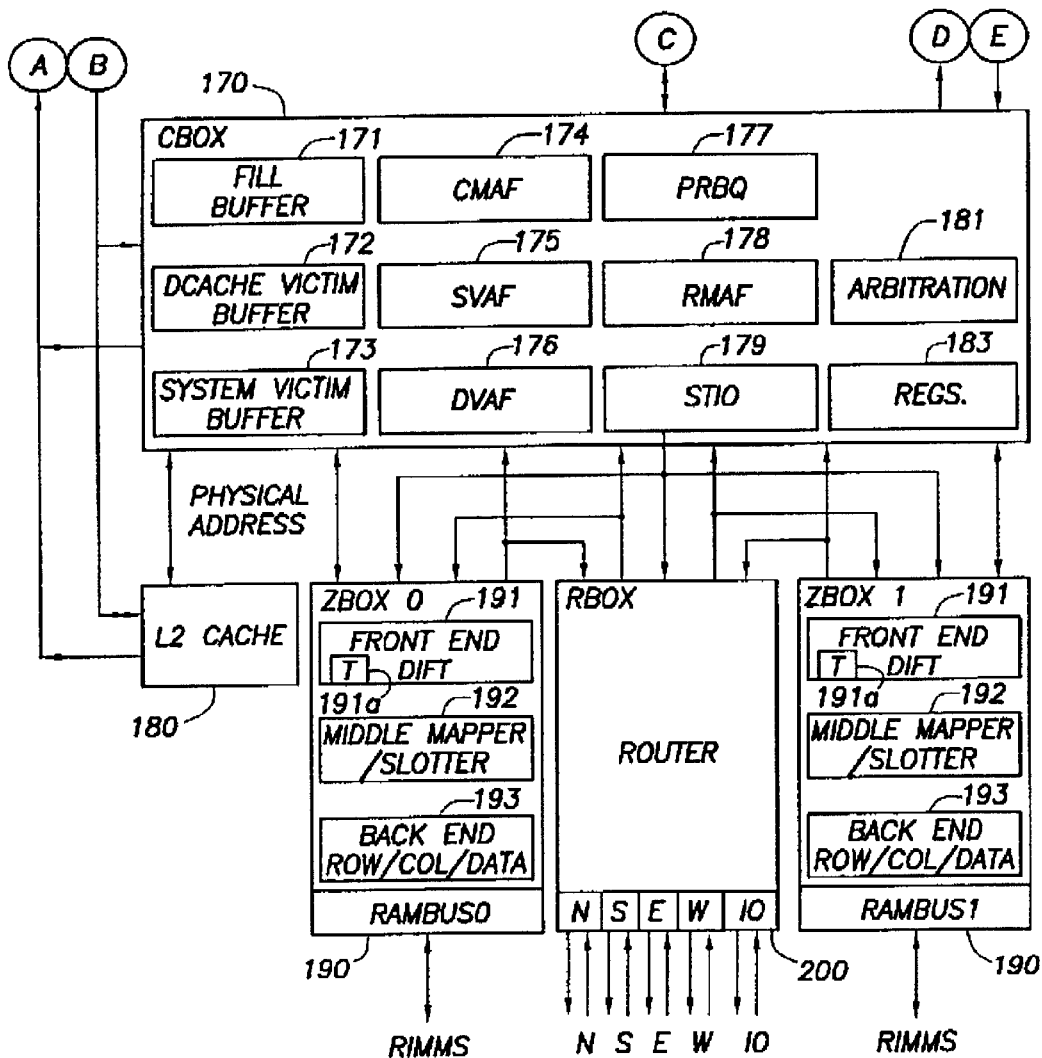

Referring now to FIGS. 2*a* and 2*b*, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicate with various other functional units control logic as shown. The instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2*a* and 2*b*, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

The branch predictor 123 is used by the Ibox 120 with regard to branch instructions. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 123 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The instruction translation buffer ("ITB") 124 couples to the instruction cache 110 and the fetch unit 121. The ITB 124 comprises a 128-entry, fully-associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, internal processor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 perform preferably the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subdluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subdluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit ("Fbox") registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It contains 32 entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It contains 32 entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor.

The MAF 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and single secondary-level, unified instruction/data ("L2") cache 180 (FIG. 2b). The L1 instruction cache 110 preferably is a 64-KB virtual-addressed, two-way set-associative cache. Prediction is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably is a 64-KB, two-way set associative, virtually indexed, a physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32 KB of data per set). The processor 100 uses two additional bits of virtual address beyond the bits that specify an 8-KB page in order to specify the data cache row index. A given virtual address might be found in four unique locations in the data cache 160, depending on the virtual-tophysical translation for those two bits. The processor 100 prevents this aliasing by keeping only one of the four possible translated addresses in the cache at any time.

The L2 cache 180 preferably is a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, an arbitration unit 181, and set of configuration registers 183.

The fill buffer 171 preferably in the Cbox is used to buffer data that comes from other functional units outside the Cbox. The data and instructions get written into the fill buffer and other logic units in the Cbox process the data and instructions before sending to another functional unit or the L1 cache. The data cache victim buffer ("VDF") 172 preferably stores data flushed from the L1 cache or sent to the System Victim Data Buffer 173. The System Victim Data Buffer ("SVDB") 173 is used to send data flushed from the L2 cache to other processors in the system and to memory. Cbox Miss-Address File ("CMAF") 174 preferably holds addresses of L1 cache misses. CMAF updates and maintains the status of these addresses. The System Victim-Address File ("SVAF") 175 in the Cbox preferably contains the addresses of all SVDB data entries. Data Victim-Address File ("DVAF") 176 preferably contains the addresses of all data cache victim buffer ("VDF") data entries.

The Probe Queue ("PRBQ") 177 preferably comprises a 18-entry queue that holds pending system port cache probe commands and addresses. This queue includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox preferably accepts requests and responds with data or instructions from the L2 cache. Data accesses from other functional units in the processor, other processors in the computer system or any other devices that might need data out of the L2 cache are sent to the RMAF for service. The Store Input/Output ("STIO") 179 preferably transfer data from the local processor to I/O cards in the computer system. Finally, arbitration unit 181 in the Cbox preferably arbitrates between load and store accesses to the same memory location of the L2 cache and informs other logic blocks in the Cbox and computer system functional units of the conflict.

Figure 8:
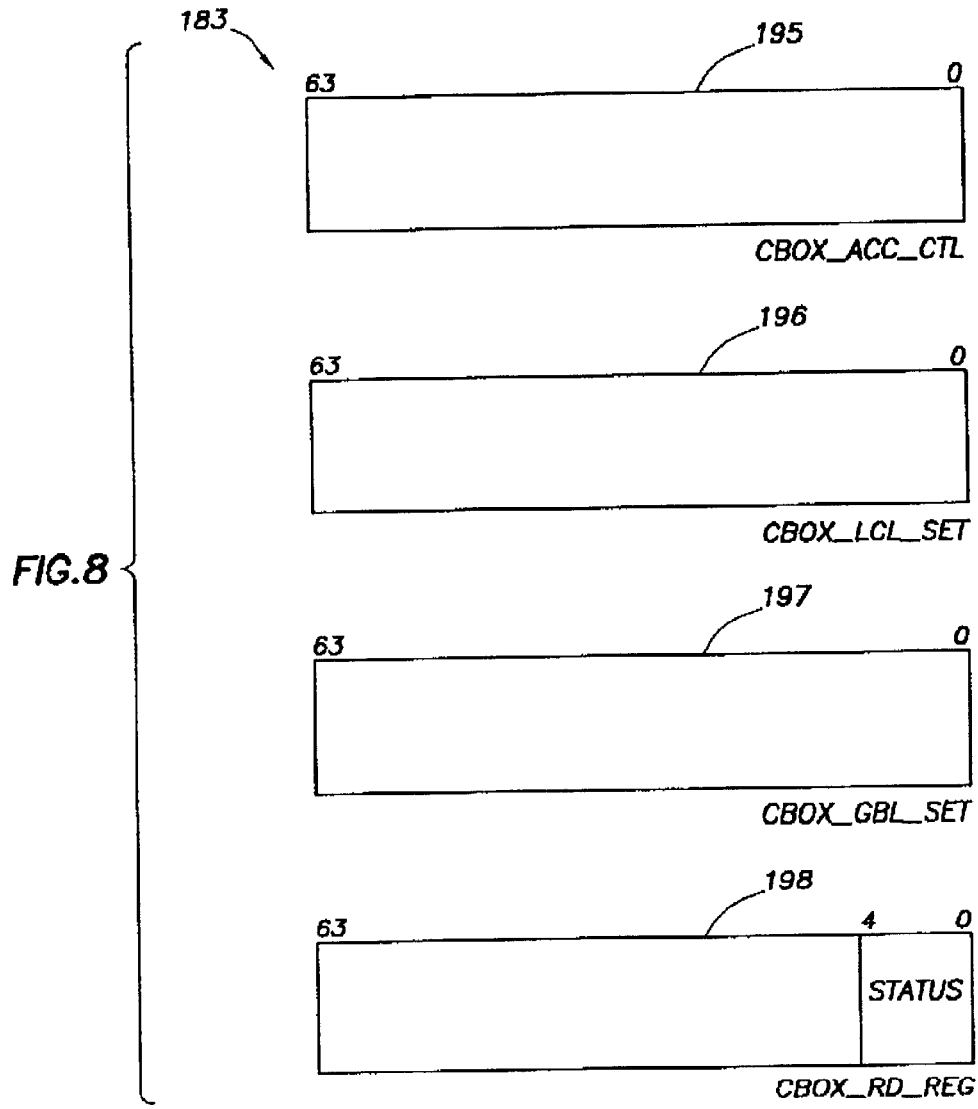
FIG. 8 shows various programmable registers used to implement the preferred embodiment of the invention.

Referring now to FIG. 8, configuration registers 183 preferably include a cbox_acc_ctl register 195, a cbox_lcl_set register 196, a cbox_gbl_et register 197 and a cbox_rd_reg 198, as well as additional registers (now shown) as desired. Each register 195–197 preferably is a 64-bit programmable register. Each bit in the cbox_acc_ctl register 195 represents a unique block of memory. The full 64-bits represent the maximum possible amount of memory at a processor. If the corresponding bit is clear, the block can only be referenced by processors in the local processor set which is defined by the cbox_lcl_set register 196. If, however, the corresponding bit is set, the blocks can only be referenced by the processors in the global processor set, defined by the cbox_gbl_set register 197.

Each bit in the cbox_icl_set register 196 represents one or more (e.g., four) processors. A set bit indicates the corresponding processor(s) are in the local processor set. Each bit in the cbox_gbl_set register 197 also represents one or more processors. A set bit indicates that the corresponding processor(s) are in the global set. A local processor preferably is always in both the local and the global processor set.

Referring still to FIG. 2b, processor 100 preferably includes dual, integrated RAMbus memory controllers 190 (Zbox0 and Zbox1). Each Zbox 190 controls 4 or 5 channels of information flow with the main memory 102 (FIG. 1). Each Zbox preferably includes a front-end directory in-flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox, sending response commands to and receiving packets from the Cbox and Rbox, and tracking up to 32 in-flight transactions. The front-end DFFT 191 also sends directory read and write requests to the Zbox and conditionally updates directory information based on request type, Local Probe Response ("LPR") status and directory state.

The middle mapper 192 maps the physical address into RAMbus device format by device, bank, row, and column. The middle mapper 192 also maintains an open-page table to track all open pages and to close pages on demand if bank conflicts arise. The mapper 192 also schedules RAMbus transactions such as timer-base request queues. The Zbox back end 193 preferably packetizes the address, control, and data into RAMbus format and provides the electrical interface to the RAMbus devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

To solve the congestion problem noted above that might result from a communication channel 102 being terminated, various timers are included in each processor 100. These timers include timers in the Rbox 200, timers in the DIFT, timers in the MAF, and write request I/O timers. Not all of these timers need be included, but preferably are for best performance.

The Rbox 200 timers will now be described with respect to FIG. 3. The Rbox 200 preferably includes network input ports 330 and microprocessor input ports 340 for input of message packets into the Rbox. The network input ports 330 preferably comprise a North input port ("NIP") 332, South input port ("SIP") 334, West input port ("WIP") 336, and East input port ("ErP") 338 that permits two-way message passing between microprocessors. The microprocessor input ports 340 preferably include Cbox input port 342, Zbox0 input port 344, Zbox1 input port 346, and I/O input port 348 for message packet transfers within the microprocessor's functional units as well as transfers to the I/O controller 104 (FIG. 1). FIG. 3 further shows two local arbiters 320 for each of the input ports 320, 340. The input ports are connected to the Rbox output ports through an interconnect and Rbox logic network 325 that connects each input port to each of the output ports shown in FIG. 3. In the preferred embodiment, each input port connects to a buffer 310 that in turn connects to a pair of local arbiters 320.

The output ports preferably include network output ports 360 and microprocessor output ports 370. In the preferred embodiment, the network output ports include North output port ("NOP") 362, South output port ("SOP") 364, West output port ("WOP") 366, and East output port ("EOP") 372. The microprocessor output ports preferably consist of Local0 output port 374, Local1 output port 376, and I/O output port 378. Each output port preferably connects to a global arbiter 350.

Each of the local arbiters 320 selects a message packet among the message packets waiting in the associated buffer 310 of the input port 330, 340. The local arbiters thus nominate a pending request from the buffer 310 for processing. The global arbiters 350 select a message packet from message packets nominated by the local arbiters 320 for transmission on an associated output port 360, 370. A more complete description of the arbitration process can be found in commonly owned, co-pending application, Ser. No. 09/652,322, entitled "Priority Rules for Reducing Network Message Routing Latency," filed on Aug. 31, 2000.

Network input ports 330 preferably are used to transfer message packets between microprocessors in the multiprocessor system 90. The microprocessor input ports 340 including Cbox input port 342, Zbox0 input port 344, and Zbox1 input port 346 preferably are used to transfer message packets within the microprocessor from the Cbox and Zbox to the Rbox. The I/O input port 348 is used to transfer I/O commands and data messages from the processor 100 to I/O devices connected to the system.

Network output ports 360 send packets to other superscalar microprocessors in the distributed shared memory computer system. The Local0 output port 374 and Local1 output port 376 direct message packets either to the Cbox or Zboxes of the microprocessor. I/O output port 378 transmits message packets to I/O devices connected to the superscalar microprocessor. Global arbiters for each output port after receiving nominations from the input port local arbiter prioritizes a message packet based on the particular input port that it originated from as described in greater detail below.

Referring still to FIG. 3, the Rbox 200 preferably includes a timer 322 associated with each output port 360, 370. Each timer preferably couples to an output port and provides a timeout signal 323 to the interconnect and Rbox logic 325. Generally, each timer 322 is used to monitor the network for congestion that may result from one or more terminated communication channels 102.

In accordance with a preferred embodiment of the invention, each timer 322 includes a separate timer for various classes of inter-processor messages. An exemplary set of message types include: forward, I/O, request, fanout, fanin, and response messages. These messages are messages that are passed from one processor to another. One or more of the applications incorporated by reference at the beginning of this disclosure discuss and describe the message types. There preferably are hierarchical dependencies between the message types. What actions are caused to occur as a result of these messages is not particularly important to the present invention. What is important, however, is that these messages are routed from one processor to another and, if one or more communication channels 102 are terminated, may cause traffic congestion when messages are unable to pass through the terminated channel.

Figure 4:
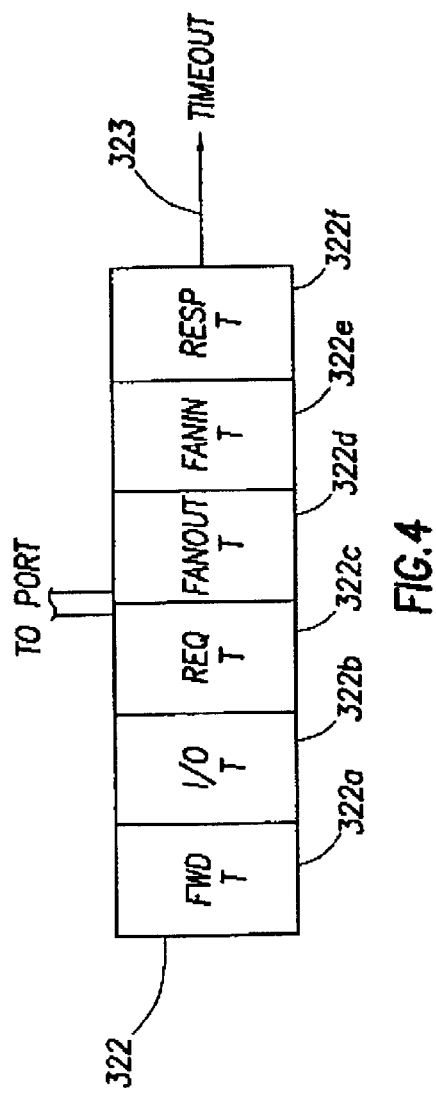
FIG. 4 shows timers for various message types used in the preferred embodiment of the invention.

FIG. 4 shows an exemplary embodiment of the output port timers 322. As shown, timer 322 preferably includes a separate timer 322a–f for each of the message classes noted above. Specifically, the timer 322 includes a forward message timer 322a, an I/O message timer 322b, a request timer 322c, a fanout message timer 322d, a fanin message timer 322e, and a response message timer 322f. Each timer 322a–322f preferably is programmable or preset. Further, each timer can be programmed or preset to expire after a different amount of time as compared to the other timers.

Figure 6:
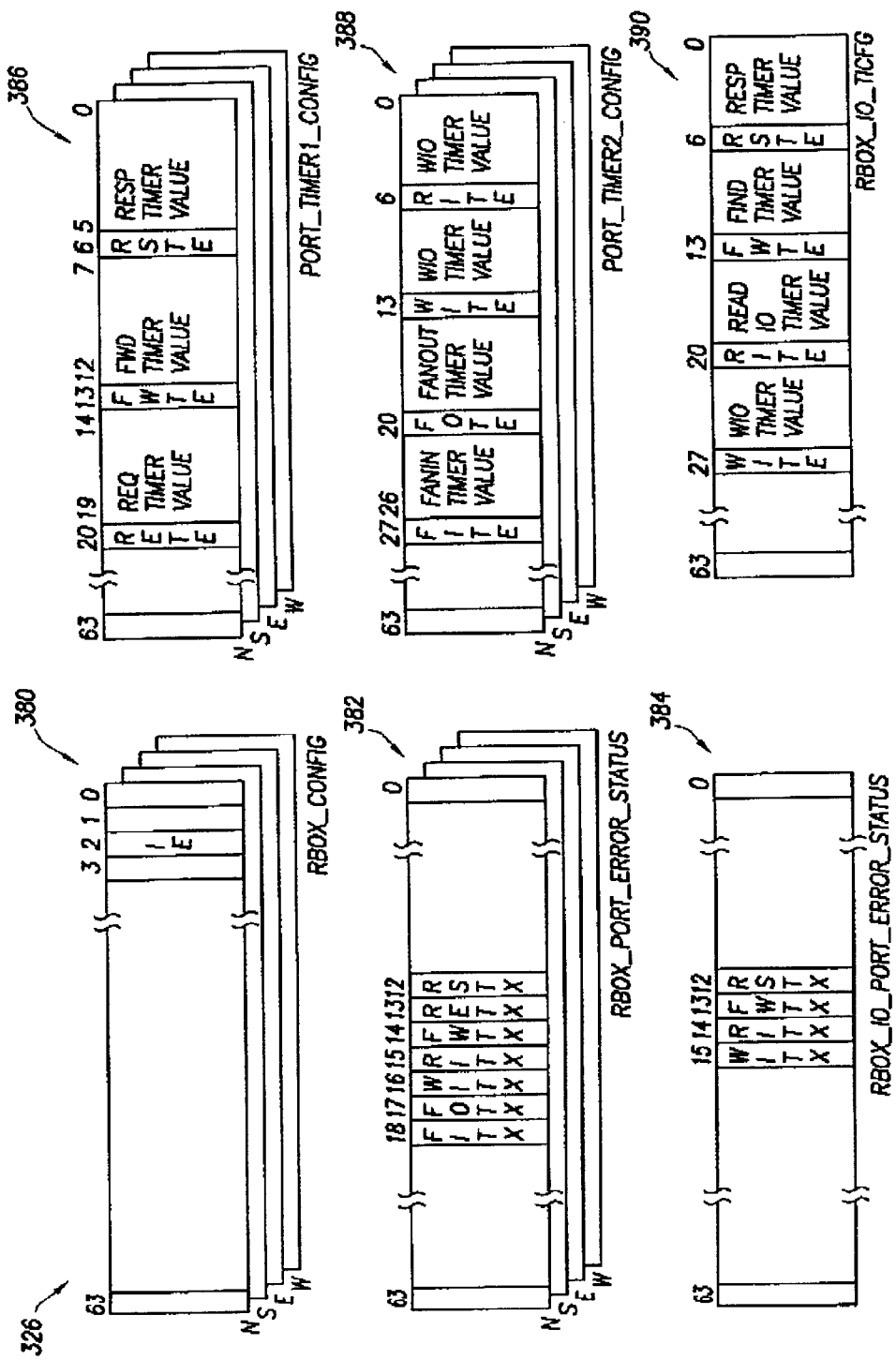
FIG. 6 shows various programmable registers used to implement the preferred embodiment of the invention.

Programming the timers 322a–f is accomplished using various registers in the Rbox's interconnect and Rbox logic 325. These registers are labeled as Rbox registers 326 in FIG. 3 and shown individually in FIG. 6. As shown in FIG. 6, the Rbox registers 326 include an rbox_config register 380, an rbox_port_error_status register 382, an rbox_io_port_error_status register 384, a port_timer1_config register 386, a port_timer2_config register 388, and an rbox_io_tlcfg register 390. Other registers may be included to control the operation of the Rbox as desired but are not shown for sake of clarity. The config register 380, the rbox_port_error_status register 382, the port_timer1_config register 386, and the port_timer2_config register 388 are implemented preferably as four separate registers as shown including one register for each of the north, south, east and west ports.

If Referring now to FIGS. 3, 4, and 6, the timers 322 for the north, south, east, and west network output ports 360 and the timer for the I/O port 378 can be programmed using the port_timer1_config, port_timer2_config, and rbox_io_tlcfg registers 386, 388 and 390. The port_timer1_config registers 386 includes enable bits 6, 13, and 20 which are used to individually enable the response timer 322f, the forward timer 322a and the request timer 322c, respectively. The count value for each timer is written into the fields adjacent each enable bit. Bits 0 to 5 are used program the response timer 322f. Bits 7 to 12 are used to program the forward timer 322a and bits 14 to 19 are used to program the request timer 322c. Each bit field preferably includes 6 bits and each corresponds to $\frac{1}{16}^{th}$ second increments. Thus, with 6 bits each timer can be programmed in $\frac{1}{16}^{th}$ second increments up to 4 seconds.

Programming the other timers in the Rbox 200 follows a similar procedure. Bits 6, 13, 20, and 27 of the port_timer2_config register 388 are used to enable or disable the read I/O timer, the write I/O timer (both of which are part of the I/O timer 322b), the fanout timer 322d, and the fanin timer 322e. The bit fields adjacent each enable bit can be loaded with 6 bit values to program the expiration time of the associated timer as described above. Similarly, the rbox_io_tlcfg register 390 includes timer enable bits 6, 13, 20, and 27 for the response timer 322f, forward timer 322e, and read and write I/O timers 322b, respectively, for the I/O output port 378. The adjacent bit fields are used to load the desired expiration times for the timers.

Figure 5:
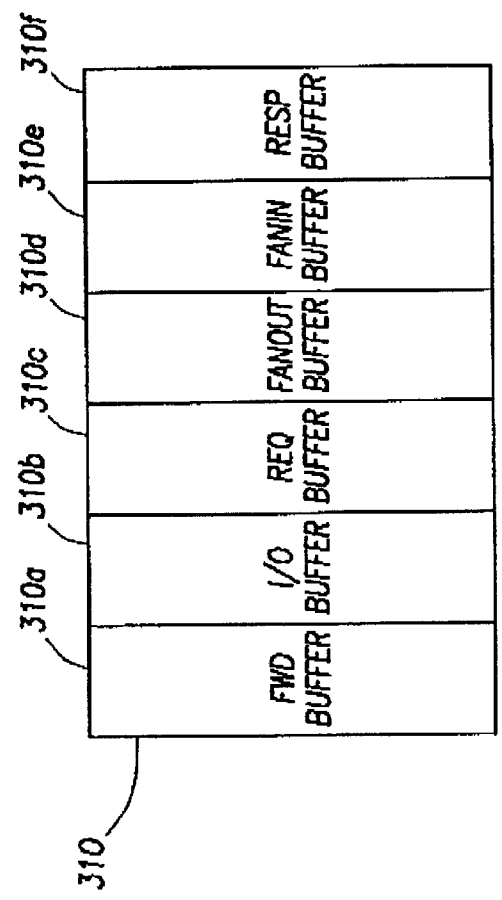
FIG. 5 shows buffers associated with each of the message types shown in FIG. 4.

Referring to FIG. 5, each of the input port buffers 310 preferably include separate storage for input messages of one or more of the various classes of messages noted above. Accordingly, a buffer 310 may contain a forward message buffer 310a, an I/O message buffer 310b, a request message buffer 310c, a fanout message buffer 310d, a fanin message buffer 310e, and a response message buffer 310f. Not every input buffer 310 shown in FIG. 3 need contain all of buffers 310a–f. For example, the IO port 348 buffer may only include a forward message buffer 310a, an I/O message buffer 310b, and a response message buffer 310f if desired. Accordingly, the timer 322 associated with I/O output port 378 may only include timers for forward messages (timer 322a), I/O messages (I/O timer 322b) and response messages (timer 322f). Further, each of the buffers 310a–f may be implemented as multiple buffers as desired. For example the I/O buffer 310b may be implemented as a write I/O buffer and a separate read I/O buffer. If so implemented I/O timer 322b may be implemented as a write I/O timer and a read I/O timer.

A buffer 310 may become full of pending transactions if a communication channel 102 in the network has been terminated. If that is the case, the buffer 310 will remain full because the buffered transactions are not permitted to be processed from the buffer due to traffic congestion in the network caused by the terminated communication channel. The timers are used as a way to help detect a traffic congestion problem.

The each class of messages at each output port 360, 370 of a sending processor 100, the associated timer 322 preferably increments whenever the input buffer 310 of the message class at the receiving processor is currently being used. The timer 322 will continue counting until it reaches its predetermined expiration value and then will assert the timeout signal 323. Each timer 322, however, is reset (e.g., forced to 0 if implemented as a count-up timer) whenever a message of the associated message class is sent out from the output port 360, 370 in which the timer 322 resides. Additionally, the timer 322 is reset whenever the receiving processor 100 frees up an input buffer 310 entry of the associated message class. To implement this latter condition, after the receiving processor frees up the buffer entry, the receiving processors preferably transmits back to the sending processor a message that indicates that buffer space has been deallocated. Upon receiving this deallocation message, the associated timer 322 is reset.

The timeout values are set so that when the timers expire, the processor 100 containing the expired timer is reasonably assured that the input buffer 310 associated with the expired timer 322 cannot empty presumable due to traffic congestion somewhere in the network. When a timer expires, an associated status bit becomes asserted in one of the Rbox status registers 382, 384 (FIG. 6). As shown, bits 12–18 of the rbox_port_error_status register 382 indicate an expired timer for a response timer 322f, request timer 322c, forward timer 322a, read/write I/O timer 322b, fanout timer 322d, and fanin timer 322e, respectively. Similarly, the rbox_io_error_status register 384 includes four status bits 12–15 to indicate an expire response timer, forward timer, and read and write I/O timers. When a timer expires (as detected by an asserted status bit in registers 382, 384, the timeout signal 323 is asserted to the interconnect and Rbox logic network 325 which responds in any suitable manner.

When one of the timers 322a–f associated with a particular output port and message class expires, the interconnect and Rbox logic 325 shuts down that output port thereby precluding messages of the same class from being sent out of the port.

Referring briefly to FIG. 6, to terminate a north, south, east or west communication port 102, the rbox_config register 380 is used. Specifically, the input enable ("IE") bit preferably is cleared to terminate the port. Other features of a port may be disabled as desired to discontinue communications.

Referring again to FIG. 2b, as shown each Zbox 190 includes a DIFT timer 191a associated with the front end DIFT 191. The DIFT timer 191a performs the function of monitoring the status of forward messages in the DIFT for network congestion. The following explanation of a forward message may be helpful to understand the function performed by the DIFT timer 191a.

Referring FIGS. 1 and 2b, processor 100a may desire to read a block of data for which processor 100b is the "home" processor. A home processor maintains the coherence directory for one or more, and preferably many, blocks of memory. Accordingly, any other processor in the system that desires to access a block of memory must transmit its request to the particular block's home processor. Processor 100b receives the request from the requestor processor 100a. Home processor 100b examines the directory entry for the requested memory block to determine the state of the block. It may be that another processor in the network has the block exclusive or that other processors have shared copies of the block. An exclusive directory state means the processor having the block exclusive can change the data. Processors that share a block can read the data, but not change it. Of course, the home processor 100b may have the block in a local state. If, for example, a copy of the requested block has given on an exclusive basis to processor 100c, home processor 100b will send a forward message to processor 100c to indicate to processor 100c that processor 100a now would like the block exclusive. As a result, processor 100c should transmit a copy of the block to processor 100a and give exclusivity to the block to processor 100a.

Each Zbox 190 performs the directory look ups to determine if a forward message is necessary. If a forward message is necessary, that message is placed into the front end DIFT 191 to eventually be processed through the Rbox 200. The front end DEFT 191 contains messages that are being processed through the system. If a communication channel 102 through which the pending DIFT transaction would normally be transmitted has been terminated due to a failure in the system, the pending DIFT forward message may never make its way out of the DIFT 191 because of ensuing traffic congestion.

To detect this type of congestion, the DIFT timer 191a monitors the status of forward messages in the front end DIFT 191. The DIFT timer 191a may include separate timers for each entry in the DIFT 191. In the preferred embodiment, the DIFT 191 is a 32 entry queue and thus, the DIFT timer 191a may include 32 separate timers. Alternatively, because it is unlikely all 32 entries in the DIFT 191 will be populated with forward messages at any given point in time, the DIFT timer 191a may have fewer timers than the number of front end DIFT 191 entries. When a forward message is placed into the front end DIFT 191, its associated DIFT timer 191a begins counting. The amount of time (i.e., number of clock cycles) for which the DIFT timer 191a counts can either be preset or programmable as discussed below.

Figure 7:
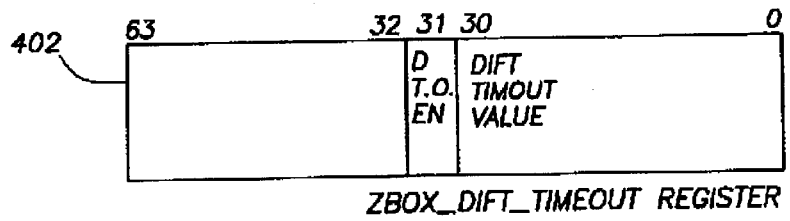
FIG. 7 shows another programmable register used to implement the preferred embodiment of the invention.

Referring briefly to FIG. 7, each Zbox 190 includes a zbox_dift_timeout register 402. As shown, register 402 includes a DIFT timeout enable bit 31 which enables or disables the DIFT timer 191a. Bit field 0 to 30 comprises a 31 bit field in which a DIFT timeout value is written. The DIFT timer 191a preferably preferably is a 5-bit, count down timer that begins decrementing from the timeout value down to 0. The timeout value loaded into bits 0 to 30 specify the period of the clock pulses counted by the DIFT timer. This allows DIFT timer timeouts in the range of $2^6$ to $2^{36}$ clock cycles.

When the DIFT timer expires, the Zbox 190 determines that the system 90 is experiencing forward message traffic congestion. In response to an expired DIFT timer 191a, the Zbox 190 preferably sets the directory state of the block to "incoherent" to indicate an error state. The prior contents of the memory location are preserved. Further, the Zbox frees up the DIFT 191 entry that contained the forward message.

The DIFT timer 191a preferably is reloaded when it counts down to 0, when the enable bit 31 transitions from the disable state to the enable state (e.g., from logic 0 to 1), or when the system resets.

Other timers can be included in processor 100 to monitor for other effects caused by traffic congestion. For example, timers can be included in or associated with the miss address file ("MAF") 154 (FIG. 2a) and write I/O ("WRIO") activity. A MAF timer can track an outstanding MAF entry and free up the MAF entry if the timer expires. A write I/O acknowledge timer can be included to count whenever a write I/O Acknowledge counter (not specifically shown) is at its maximum value preventing subsequent write I/O messages from proceeding or if an MB is waiting for the acknowledge counter to reach zero. Then the write I/O acknowledge timer expires, the acknowledge counter preferably is cleared.

Referring again to the Cbox register set 183 of FIG. 8, the cbox_rd_reg 198 preferably includes five bits for status information, e.g., bits 0–4 as shown. These bits preferably are used to encode whether a MAF timer has expired, whether a WRIO timer has expired, whether an error response was received to an L2 cache miss, and whether data and/or instruction streams resulted in a defective memory fill. Other bits, either in the cbox_rd_reg 198 or another Cbox register specify the directory state of a corrupted block, which is information useful to determine the extent of a data corruption after an error.

The processor 100 preferably implements a "sweep" mode that permits software to scan directory states searching for incoherent blocks. This mode is enabled by setting a bit in a register in the Cbox (such register not specifically shown). When the processor 100 is in the sweep mode, local references that find the block in a local state will return the block normally. Local references that find the block in a shared state will return the block normally and update the state of the block to local without sending out shared invalidate messages. Finally, local references that find the block in either the exclusive or incoherent states will set an incoherent bit in a Zbox register (not specifically shown) so that software can determine that the block is incoherent and update the block's state to incoherent.

Referring again to FIG. 1, in accordance with the preferred embodiment of the invention, the timeout values of the various timers 322, 191a discussed above can and preferably are set differently for the processor ports that connect processors between two domains. This permits increased flexibility in managing the domains for failure isolation.

Preferably, because of hierarchical dependencies between the message types as noted above, the various timers are programmed or preset in such a way to minimize or eliminate collateral damage resulting from a network failure. One suitable ordering from shortest timeout time to longest time for a semi-hard domain implementation is the following:
1. Router inter-domain responses
2. Router intra-domain responses/router intra-domain fanins
3. Router intra-domain fanouts
4. Router inter-domain forwards
5. DIFT entry timers
6. Router inter-domain requests
7. Router inter-domain I/O and router intra-domain requests
8. Router intra-domain I/O
9. MAFtimers
10. IO Acknowledge timers The above ordering is preferred because it ensures that a timeout of a MAF or DIFT entry or a WRIO acknowledge should only occur because a message truly became lost. Preferably, a response should not be delayed so long that it arrives after the associated MAF or DIFT entry times out.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A multi-processor computer system, comprising:

a plurality of processors coupled together to permit messages to be transmit from one processor to another processor, wherein said message types include forward, request, response and input/output message types;

at least one of said processors is coupled to at least one input/output device; and wherein each processor can send a plurality of different message types to other of said processors and each processor includes a separate timer associated with each of said message types to expire when a message of the associated message type is not sent from the processor in a predetermined amount of time.

2. A multiprocessor computer system, comprising:

a plurality of processors coupled together to permit messages to be transmit from one processor to another processor, at least one of said processors is coupled to at least one input/output device; and each processor having at least one timer that expires when a message is not sent from the processor in a predetermined amount of time; and wherein each processor includes a directory in-flight table that tracks pending messages and a timer associated with said directory in-flight table to monitor for traffic congestion.

3. A processor that can be coupled to other processors to form a multi-processor system and can exchange messages with other processors in the system, the processor comprising:

router logic that can be coupled to at least one other processor;

said router logic having at least one timer that expires when a message is not sent from the Processor in a predetermined amount of time;

wherein each processor can send a plurality of different message types to other of said processors and each includes a separate timer associated with each of said message types to expire when a message of the associated message type is not sent from the processor in a predetermined amount of time; and wherein said message types include forward, request, response and input/output message types.

4. A processor that can be coupled to other processors to form a multi-processor system and can exchange messages with other processors in the system, the processor comprising:

router logic that can be coupled to at least one other processor;

said router logic having at least one timer that expires when a message is not sent from the processor in a predetermined amount of time; and wherein each processor includes a directory in-flight table that tracks pending messages and a timer associated with said directory in-flight table to monitor for traffic congestion.

* * * * *